United States Patent
Ito

(10) Patent No.: US 9,316,981 B2
(45) Date of Patent: Apr. 19, 2016

(54) IMAGE FORMING SYSTEM, IMAGE FORMING SYSTEM CONTROL METHOD, AND IMAGE FORMING APPARATUS HAVING TANDEM-ACTIVATION FUNCTION AND INDEPENDENT-ACTIVATION FUNCTION

(71) Applicant: KONICA MINOLTA, INC., Chiyoda-ku, Tokyo (JP)

(72) Inventor: Masayuki Ito, Nagoya (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/223,822

(22) Filed: Mar. 24, 2014

(65) Prior Publication Data

US 2014/0286658 A1    Sep. 25, 2014

(30) Foreign Application Priority Data

Mar. 25, 2013  (JP) ................................. 2013-062321

(51) Int. Cl.
```
G03G 21/00      (2006.01)
G03G 15/00      (2006.01)
G06F 3/12       (2006.01)
```
(52) U.S. Cl.
CPC ........ G03G 15/5004 (2013.01); G03G 15/5083 (2013.01); G06F 3/1222 (2013.01); G06F 3/1229 (2013.01); G06F 3/1291 (2013.01); G03G 2215/00113 (2013.01)

(58) Field of Classification Search
CPC ................................................ G03G 15/5004
USPC .............................. 399/38, 8; 358/1.15, 1.18
See application file for complete search history.

(56) References Cited

U.S. PATENT DOCUMENTS

| 5,809,363 A * | 9/1998 | Kitamura et al. ................. 399/8 |
| 7,031,014 B2 * | 4/2006 | Ohwa .......................... 358/1.18 |
| 8,930,510 B2 * | 1/2015 | Matsuhara et al. ........... 709/221 |
| 2002/0015177 A1 * | 2/2002 | Yamakado et al. .......... 358/1.15 |

FOREIGN PATENT DOCUMENTS

| JP | 2007-001175 A | 1/2007 |
| JP | 2012-056263 A | 3/2012 |
| JP | 2013024891 A | 2/2013 |

OTHER PUBLICATIONS

Japanese Office Action dated Feb. 24, 2015 issued in counterpart Japanese Application No. 2013-062321.

* cited by examiner

*Primary Examiner* — Quana M Grainger
(74) *Attorney, Agent, or Firm* — Holtz, Holtz & Volek PC

(57) ABSTRACT

An image forming system includes a plurality of image forming apparatuses which are each equipped with an image forming section and a control section, and which are connected such that each image forming apparatus can form an image on the same recording sheet. The control section has a function to perform a first activation control to in tandem activate the plurality of image forming apparatuses and a second activation control to independently activate each of the plurality of image forming apparatuses. With this configuration, activation and stopping are managed appropriately with respect to each operating state, and wasteful power consumption is reduced.

15 Claims, 4 Drawing Sheets

Fig. 2

| STATE | TRIGGER | | | FUNCTIONS | | | | | | | | | | CONTROL MODE |
|---|---|---|---|---|---|---|---|---|---|---|---|---|---|---|
| | MAIN POWER SWITCH | SUB POWER SWITCH | INSTRUCT COMMUNI-CATE | CPU STATE | WHOLE CONTROL | MODEM | OPERATION SECTION | CONTROLLER | SCANNER | SHEET SUPPLY | PRINTER | SHEET PROCESSING | |
| PERFECT STOP STATE | OFF | OFF | – | IMPOSSI-BLE | OFF | OFF | OFF | OFF | OFF | OFF | OFF | OFF | |
| | OFF | | – | IMPOSS-IBLE | OFF | OFF | OFF | OFF | OFF | OFF | OFF | OFF | |
| STOP STATE (COMMUNI-CATION POSSIBLE) | ON | OFF | NO | POSSI-BLE | ON | ON | OFF | OFF | OFF | OFF | OFF | OFF | |
| | ON | | NO | POSS-IBLE | ON | ON | OFF | OFF | OFF | OFF | OFF | OFF | |
| RUNNING STATE | ON | ON | NO/YES | RUNNING | ON | ON | ON | ON | ON | ON | ON | OFF | INTERLOCKED |
| | ON | | NO/YES | RUNNING | ON | ON | OFF | ON | OFF | OFF | ON | ON | |
| COMMUNI-CATION STATE (MASTER) | ON | OFF | YES | POSSI-BLE | ON | ON | ON (dark) | ON | ON | ON | ON | OFF | INDEPENDENT |
| | ON | | NO | IMPOSS-IBLE | ON | ON | OFF | OFF | OFF | OFF | OFF | OFF | |
| COMMUNI-CATION STATE (SLAVE) | ON | OFF | NO | IMPOSSI-BLE | ON | ON | OFF | OFF | OFF | OFF | OFF | OFF | INDEPENDENT |
| | ON | | YES | POSS-IBLE | ON | ON | OFF | ON | OFF | OFF | ON | ON | |

[ In each column in this Figure,
The upper line of the listed two lines shows the state of the upstream image forming apparatus 100.
The lower line of the listed two lines shows the state of the image forming apparatus 300 in the downstream. ]

IMAGE FORMING SYSTEM, IMAGE FORMING SYSTEM CONTROL METHOD, AND IMAGE FORMING APPARATUS HAVING TANDEM-ACTIVATION FUNCTION AND INDEPENDENT-ACTIVATION FUNCTION

This application claims priority under 35 U.S.C. §119 to Japanese Patent Application No. 2013-062321 filed on Mar. 25, 2013, the entire disclosure of which is incorporated herein by reference in its entirety.

BACKGROUND OF THE INVENTION

1. Field of the Invention

The present invention relates to a management technique of states of a power supply in an image forming system having a plurality of image forming apparatuses.

2. Description of Related Art

There is an image forming system in which two image forming apparatuses are series-connected. In such an image forming system, each of the image forming apparatuses deals with image formation for each side of the same sheet, whereby productivity is increased. Further, it is possible that the upstream one or two image forming apparatuses form an image on a sheet with normal YMCK toners, and another image forming apparatus connected on the downstream side can be used to superpose a transparent color or a special color (other color than YMCK) on the same sheet.

Such an image forming system can be configured by connecting a plurality of normal image forming apparatuses. Then, any one of the image forming apparatuses works as a master apparatus to control the whole image forming system. Further, the other image forming apparatuses works as slave apparatuses, according to the control of the master apparatus.

Note that since the image forming system is made up of a plurality of image forming apparatuses connected, even when an image formation is performed by only one image forming apparatus, power supplies of all the image forming apparatuses need to be in an on-state. In other words, the power supplies of all the image forming apparatuses in the image forming system need to be in the on-state, and the sheet needs to be sequentially conveyed by all the image forming apparatuses of the most upstream side to the most downstream side.

For this purpose, a control is performed such that receiving an instruction of turning on the power supply from the image forming apparatus working as the master apparatus, the power supplies of all the other image forming apparatuses in the image forming system are in tandem turned on. With respect to the management of the state of the power supply of such an image forming system, Japanese Laid-Open Patent Application Publication No. 2007-1175 and Japanese Laid-Open Patent Application Publication No. 2012-56263 give various relevant proposals.

In a normal image forming system made up of a plurality of image forming apparatuses, and in tandem control of on/off of the power supplies of all the image forming apparatuses is performed as described above. Thus, for example, when performing a remote diagnosis in which an image forming apparatus is activated by a communication from outside to read a state of the apparatus, the power supplies of all the image forming apparatuses in the image forming system are set in the on-state even when the state of apparatus of only any one of the image forming apparatuses is read out.

As a result, since the image forming apparatus which does not need to be subjected to the remote diagnosis is in tandem turned on, a problem arises that wasteful power is consumed. As a management of the state of power supply in the image forming system made up of a plurality of image forming apparatuses, the above Japanese Laid-Open Patent Application Publication No. 2007-1175 proposes a technique in which the whole image forming system is in tandem shifted from a normal power consumption state to a power saving state. This case is a control in which the whole image forming system in tandem operates such that the whole image forming system becomes in the power saving state or the whole image forming system becomes in the normal power consumption state. Thus, such technique cannot deal with the wasteful power consumption, on which the present application focuses, in the image forming apparatus which does not need to be activated.

Further, as a management of the state of power supply in the image forming system made up of a plurality of connected image forming apparatuses, the above Japanese Laid-Open Patent Application Publication No. 2012-56263 proposes a technique in which, depending on image formation (for example, one-side/both-side) modes, (a) the sections of the whole system are powered on in the case of the both-side image forming mode, and (b) all but a part (charge, exposure, development, transfer, fixing, and the like of the image forming section which are not to be used) is powered on in the case of the one-side image forming mode. In this case, the whole image forming system is in a power-on-state, and unnecessary sections are in a state of power saving. That is to say, such technique cannot deal with the wasteful power consumption, on which the present application focuses, in the image forming apparatus which does not need to be activated.

SUMMARY OF THE INVENTION

An image forming system reflecting an aspect of the present invention constituted by: a plurality of image forming apparatuses, each of the image forming apparatuses including: an image forming section configured to form an image on a recording sheet; and a control section configured to control sections of the image forming apparatus, the plurality of image forming apparatuses being connected so that each image forming apparatus is able to perform image formation on the same recording sheet, wherein the control section included in any one of the image forming apparatus has a function to perform a first activation control in which the plurality of image forming apparatuses are in tandem activated and a second activation control in which each of the plurality of image forming apparatuses is independently activated.

Here, it is preferable that the control section has an function to perform either of the first activation control and the second activation control, depending on a type of a provided instruction.

Further, it is preferable that each of the plurality of image forming apparatuses includes a communication section configured to communicate with an external device outside of the image forming system; and any one of the plurality of image forming apparatuses includes an operation section to which various types of instructions are input, wherein the control section performs the first activation control when the input instruction is an activation instruction through the operation section, and performs the second activation control when the input instruction is an activation instruction from the external device through the communication section.

Further, it is preferable that the communication section has a function to communicate with another control section in the image forming system in addition to with the external device, and the control section performs the first activation control when the input instruction is an activation instruction from another control section through the communication section.

Further, it is preferable that the control section has a function to perform a first stop control to put the plurality of image forming apparatuses in tandem in a stopped state, and to perform a second stop control to put each of the plurality of image forming apparatuses independently in the stopped state.

Further, it is preferable that the control section performs, when the control section has accepted an instruction of the first stop control and neither of the image forming apparatuses has received an instruction of the second activation control, the first stop control; and the control section does not perform, when the control section has accepted the instruction of the first stop control and any of the image forming apparatuses has received the instruction of the second activation control, the first stop control and maintains the activated state while performing the second activation control.

Further, it is preferable that in the image forming apparatus which has accepted the instruction of the second stop control, the control section performs, when the control section has not received the instruction of the first activation control, the second stop control; and the control section does not perform, when the control section has received the instruction of the first activation control, the second stop control and maintains the activated state.

Further, it is preferable that each of the plurality of image forming apparatuses includes a communication section configured to communicate with an external device outside of the image forming system; and any one of the a plurality of image forming apparatuses includes an operation section to which various types of instructions are input, wherein the control section deals with an instruction of stop through the operation section as the first stop control; and the control section deals with a completion of communication from the external device through the communication section as the second stop control.

BRIEF DESCRIPTION OF THE DRAWINGS

FIG. 2 is an explanatory diagram showing states of various sections of an embodiment of the present invention;

DETAILED DESCRIPTION OF THE PREFERRED EMBODIMENT

Figure 1:
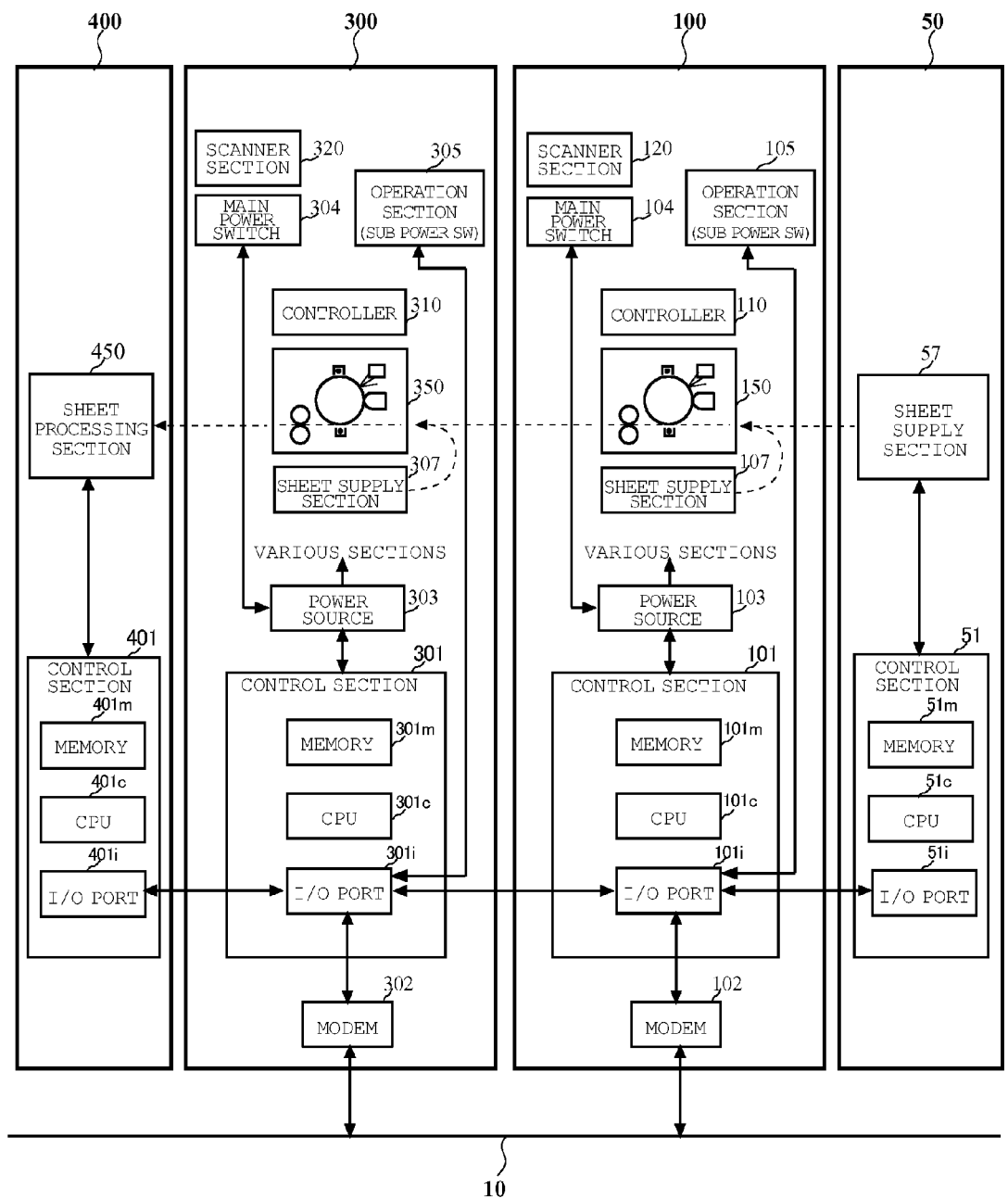
FIG. 1 is a configuration diagram showing a configuration of an embodiment of the present invention.

In the following paragraphs, one or more embodiments of the invention will be described by way of example and not limitation. It should be understood based on this disclosure that various other modifications can be made by those in the art based on these illustrated embodiments. Referring to the drawings, one or more embodiments in accordance with the present invention (hereinafter, referred to as an embodiment) will be detailed in the following.

Configuration of Image Forming System

A configuration of an image forming system made up of a plurality of connected image forming apparatuses in which a plurality of image forming apparatuses are connected or a configuration of an image forming apparatus which can be connected to such an image forming system will be described in detail, based on FIG. 1.

There is provided a sheet supply device 50 which can supply a sheet stored in a sheet supply tray when needed; an image forming apparatus 100 on the upstream side configured to form an image on a sheet; an image forming apparatus 300 on the downstream side configured to form an image on the same sheet; a sheet processing device 400 configured to perform various types of sheet processes (a punch process, a center fold process, a staple process, and the like) on the sheet on which image formation has been performed on the image forming apparatuses 100 and 300.

In the image forming system shown in FIG. 1, there are shown, as an example, various devices arranged along a sheet flow indicated by a broken line.

In the drawing, the image forming system is constituted by two image forming apparatuses of the image forming apparatus 100 and the image forming apparatus 300 connected along the sheet flow. In this image forming system, each image forming apparatus performs image formation on each side of a sheet, thereby improving productivity.

Alternatively, instead of sharing the front and back of the same sheet, different colors may be shared by a plurality of image forming apparatuses. In addition, between the image forming apparatus 100 and the image forming apparatus 300, there may be connected a sheet reversing device (not shown). Alternatively, inside the image forming apparatus 100 or the image forming apparatus 300, there may be connected a sheet reversing device (not shown).

That is to say, the image forming system described here is configured such that a plurality of image forming apparatuses are connected so that each image forming apparatus can form an image on the same recording sheet. Such image forming system like this is referred here to as an "image forming system made up of a plurality of connected image forming apparatuses."

Note that the number of the image forming apparatuses to be connected in the image forming system is not limited to two, and three or more image forming apparatuses may be connected. For example, an image forming system can be constituted by the combination of an image forming apparatus for forming on the front surface of a sheet an image in a predetermined color, an image forming apparatus for forming on the back surface of a sheet in a predetermined color, and an image forming apparatus for forming on either side of a sheet an image in different colors (a transparent color, a special color (a color different from a colors used for normal image formation)).

A description will be made, taking a multifunction peripheral (MFP) or a copy machine connected to a network 10 as a communication line and having functions of a scanner, a copy machine, a printer, and a facsimile apparatus as a specific example of the image forming apparatuses 100 and 300 used for the image forming system of the embodiment.

Note that common sections which are known as the image forming apparatuses 100 and 300 and which are not directly related to typical operations or controls of the embodiment are not described in detail.

The detailed configuration of different devices in the image forming system will be described below. The sheet supply device 50 is configured to have a control section 51 configured to control various sections in the sheet supply device 50 and a sheet supply section 57 configured to supply a sheet stored in the sheet supply tray.

The control section 51 here has an I/O Port 51*i*, a CPU (Central Processing Unit) 51*c*, and a memory 51*m*. As the memory 51*m*, any of a volatile memory and a nonvolatile memory can be used.

Here, the I/O Port 51*i* has a function to communicate with a control section 101 to be described later. The CPU 51*c* controls a sheet supply operation according to a control program. The memory 51*m* stores the control program and various types of states.

The image forming apparatus 100 controls various sections in the image forming apparatus 100 and devices (here, the sheet supply device 50) connected thereto. In addition, the image forming apparatus 100 is configured to have a control section 101, a modem 102, a power source 103, a main power switch 104, an operation section 105, a sheet supply section 107, a controller 110, a scanner section 120, and an image forming section 150.

The control section 101 controls the whole image forming system. The modem 102 communicates with other devices through the network 10, as a communication section. The power source 103 supplies electric power to the sections in the image forming apparatus 100. The main power switch 104 switches on/off of the power source 103. The operation section 105 includes a sub power switch 105*sw*, receives operation inputs, and displays states. The sheet supply section 107 supplies or inserts a sheet stored in a sheet supply tray. The scanner section 120 reads a document to generate image data. The image forming section 150 forms an image on a sheet, based on an image-forming instruction and image data.

The control section 101 here includes an I/O Port 101*i*, a CPU 101*c*, and a memory 101*m*. The memory 101*m* may be any of a volatile memory and a nonvolatile memory. The I/O Port 101*i* has a function to communicate with the control section 51 and a control section 301 to be described later, as a communication section. The CPU 101*c* controls an image formation operation and various types of operations according to a control program. The memory 101*m* stores the control program and various types of states.

The image forming section 150 forms an image on a sheet by, for example, the electrophotographic method. In particular, an electrostatic latent image is formed on a charge image carrier, the electrostatic latent image is development to be a toner image, the toner image is transferred to a sheet, and the toner image on the sheet is heated to be fixed, whereby an image is formed. Note that the sheet on which the image has been formed by the image forming section 150 is conveyed toward an image forming section 350 of the image forming apparatus 300 on the downstream side.

When the, main power switch 104 in the image forming apparatus 100 is turned on, the power source 103 supplies electric power to the control section 101 and the modem 102. In addition, when the sub power switch 105*sw* is turned on, the power source 103 supplies electric power to the sections in the image forming apparatus 100 under the control of the control section 101.

The image forming apparatus 300 is connected on the downstream side, of the image forming apparatus 100, in the sheet conveyance direction and has the same type of configuration similar to the image forming apparatus 100. The image forming apparatus 100 and the mage forming apparatus 300 may have the completely same configuration or have similar configurations which are partially the same.

The image forming apparatus 300 is configured to have the control section 301, a modem 302, a power source 303, a main power switch 304, an operation section 305, a sheet supply section 307, a controller 310, a scanner section 320, and an image forming section 350.

The control section 301 controls various sections in the image forming apparatus 300 and devices (the sheet processing device 400) connected thereto. The modem 302 communicates with other devices through the network 10, as a communication section. The power source 303 supplies electric power to the sections in the image forming apparatus 300. The main power switch 304 switches on/off of the power source 303. The operation section 305 includes a sub power switch 305*sw*, receives operation inputs, and displays states. The sheet supply section 307 supplies or inserts a sheet stored in a sheet supply tray. The scanner section 320 reads a document to generate image data. The image forming section 350 forms an image on a sheet, based on an image-forming instruction and image data.

The control section 301 here includes an I/O Port 301*i*, a CPU 301*c*, and a memory 301*m*. The memory 301*m* may be any of a volatile memory and a nonvolatile memory. The I/O Port 301*i* has a function to communicate with the control section 101 and a control section 401 to be described later, as a communication section. The CPU 301*c* controls an image formation operation and various types of operations according to a control program. The memory 301*m* stores the control program and various types of states.

The operation section 305 including the sub power switch 305*sw* operates as usual when the image forming apparatus 300 is not connected to other image forming apparatuses. The operation section 305 including the sub power switch 305*sw* is taken to be inactive by the control section 301 when the image forming apparatus 300 operates as a slave apparatus of the image forming system made up of a plurality of connected image forming apparatuses.

The image forming section 350 is configured to be similar to the image forming section 150 and to perform image formation on a different side of the same sheet or on the same sheet in a different color. Note that the sheet on which an image has been formed in the image forming section 350 is conveyed toward a sheet processing section 450 of a sheet processing device 400 on the downstream side.

In the image forming apparatus 300, when the main power switch 304 is turned on, the power source 303 supplies electric power to the control section 301 and the modem 302. Then, when the control section 301 is supplied with electric power from the power source 303, the power source 303 supplies electric power to the sections in the image forming apparatus 300 under the control of the control section 301.

The sheet processing device 400 is configured to have a control section 401 and the sheet processing section 450. The control section 401 here controls various sections in the sheet processing device 400. The sheet processing section 450 performs various types of sheet processes on the sheet from the image forming apparatus 300. The control section 401 includes an I/O Port 401*i*, a CPU 401*c*, and memory 401*m*. The I/O Port 401*i* here has a function to communicate with a control section 301, as a communication section. The CPU 401*c* control a sheet processing operation according to a control program. The memory 401*m* stores the control program and various types of states. Any of a volatile memory and a nonvolatile memory may be possibly used.

Control State of the Image Forming System

FIG. 2 is an explanatory diagram showing a list of triggers of the control of the image forming system, states of the image forming system, and functions of the sections in the image forming system. In each column in FIG. 2, the upper line of the listed two lines shows the state of the upstream image forming apparatus 100. The lower line of the listed two lines shows the state of the image forming apparatus 300 in the downstream.

Note that the on/off of the functions of the sections to be described below may be turned on and off by the supply/stop of electric power to the sections from the power source. Alternatively, the on/off may be realized according to an instruction of activate/stop from the control section while the electric power is constantly supplied to the sections.

The trigger here refers to the on/off states of the main power switches 104 and 304, the on/off state of the sub power switch 105sw, and start-up-communication instructions from external devices through the modems 102 and 302. The start-up-communication instruction from the external device corresponds to the start-up command to activate the image forming apparatus 100 and the image forming apparatus 300 or a packet of a Wake On LAN. By these triggers, the states of the image forming system and the functions of the sections are controlled as described later.

When the main power switch 104 and the main power switch 304 are both in the off-state, the sub power switch 105sw is naturally off, and then the control section 101 and the control section 301 are not supplied with electric power and cannot operate, whereby the image forming system is in a perfect stop state and the sections are all off (see "perfect stop state" in FIG. 2).

When the main power switch 104 and the main power switch 304 are both in the on-state, and the sub power switch 105sw are in the off-state, and no start-up-communication instruction are not issued, since the control section 101, the modem 102, the control section 301, and the modem 302 are supplied with electric power, the CPU is ready to operate and the communication is on, whereby the image forming system is in a stopped state in which communication is possible, and the functions of the sections other than the control section and the modem are off (see "stopped state (communication possible)" in FIG. 2).

When the main power switch 104 and the main power switch 304 are both in the on-state, and the sub power switch 105sw is in the on-state, the image forming system is in a running state in which image formation is possible, the sections (the operation section 305, the scanner section 320, the sheet supply section 307, the sheet processing control on the side of the image forming apparatus 100) which are not to be used as the image forming system made up of a plurality of connected image forming apparatuses are off, and the other functions are on. Note that in this case, since the sub power switch 105sw activates the running state, the functions of the sections are the same regardless of existence or non-existence of the start-up-communication instruction (see "operating state" in FIG. 2).

When the main power switch 104 and the main power switch 304 are both in the on-state, and the sub power switch 105sw are in the off-state, and the control section 101, the modem 102, the control section 301, and the modem 302 are supplied with electric power, and in addition, the start-up-communication instruction from the external device is on the side of the image forming apparatus 100, the following operations are performed. On the side of the image forming apparatus 100, in order to address a remote diagnosis and the like, in the similar way to the case of the running state the sections (the sheet processing control on the side of the image forming apparatus 100) which are not to be used are turned off, and the other sections are turned on. The operation section 105 is set in the on-state with a backlight tuned off since the operation section 105 is not to be operated by an operator. On the side of the image forming apparatus 300, the functions of the sections other than the control section 301 and the modem 302 are set off in order to reduce power consumption (see "state of communication (master apparatus)" in FIG. 2).

When the main power switch 104 and the main power switch 304 are both in the on-state, and the sub power switch 105sw is in the off-state, the control section 101, the modem 102, the control section 301, the modem 302 are supplied with electric power, and in addition, the start-up-communication instruction from the external device is on the side of the image forming apparatus 300, the following operation are performed. On the image forming apparatus 300 side, in order to address the remote diagnosis and the like, in the similar way to the case of the running state, the sections (the operation section 305, the scanner section 320, and the sheet supply section 307) which are not to be used are set off, and the other functions are set on. On the side of the image forming apparatus 100, in order to reduce power consumption, the function of the sections other than the control section 101 and the modem 102 are set off (see "state of communication (slave apparatus)" in FIG. 2).

Further, in the image forming system, the states of the triggers (the switches and the communications) and the states of the functions of the sections and the image forming system are stored in a memory and the like for storing flags and states according to the control programs executed by the control section 101 and the control section 301. Then, the flags, the memory, and the like are referred to in the control programs executed by the control section 101 and the control section 301, whereby an appropriate process and control are performed in the various states.

Operation (Activation Control) of the Image Forming System

In the following description of the operation of the activation control, the first activation control to in tandem activate the plurality of image forming apparatuses is referred to as an "in tandem-activation control." Alternatively, the second activation control to independently activate the plurality of image forming apparatuses is referred to as an "independent-activation control."

With reference to the flow chart in FIG. 3, the activation control of the image forming system will be described. Here, description will be made assuming the image forming apparatus 100 on the upstream side as the master apparatus or a first apparatus functioning as a master, and the image forming apparatus 300 on the downstream side as the slave apparatus or a second apparatus functioning as a master.

In addition, the image forming system is here in the state that the main power switch 104 is on, the main power switch 304 is on, and the sub power switch 105sw is off; and the control starts from the "stopped state (communication possible)" in FIG. 2.

Figure 3:
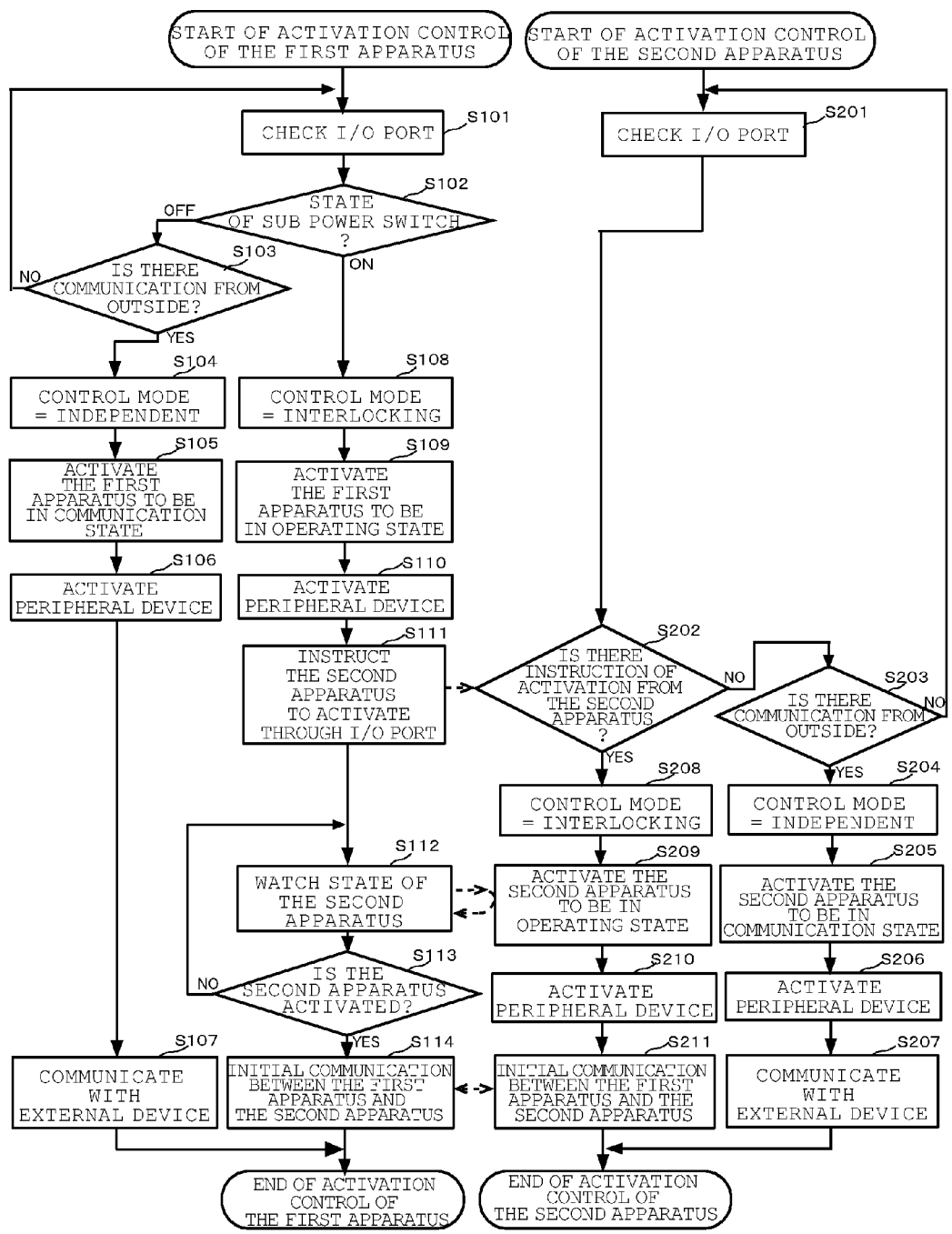
FIG. 3 is a flow chart showing an operating state related to an activation control of an embodiment of the present invention.

First, in the image forming apparatus 100, the control section 101 and the modem 102 are on, and the control section 101 cyclically checks the states of the sub power switch 105sw and the existence of non-existence of the communication (the start-up-communication instruction) to the modem 102 from the external device by checking the state of the I/O Port 101i (steps S101-S103 in FIG. 3).

Here, when the start-up-communication instruction to the modem 102 from the external device is confirmed while the sub power switch 105sw is off (step S101-S103 in FIG. 3: step S102: OFF, step S103: YES), the control section 101 determines that the control mode=independent for the image forming apparatus 100 (step S104 in FIG. 3, the state in FIG. 2: state of communication (master apparatus), and the control mode=independent).

Thus, the control section 101 activates the image forming apparatus 100 to be in the state of communication (step S105 in FIG. 3) to be able to address the remote diagnosis and the like. That is to say, the functions (the operation section, the controller, the scanner, the sheet supply section, and printer) other than the sections (the sheet processing control on the side of the image forming apparatus 100) which are not to be used are set on. Note that since the state is in the state of communication, the operation section 105 is set in the on-state with the backlight being off. Further, in order to address the remote diagnosis and the like, the control section 101 provides an activation instruction from the I/O Port 101*i* through the I/O Port 51*i* to control section 51 to activate the sheet supply device 50 as a peripheral device controlled by the image forming apparatus 100 (step S106 in FIG. 3). In this state, the control section 101 communicates with the external device through the modem 102 to perform the process of the remote diagnosis and the like (step S107 in FIG. 3).

Although the image forming apparatus 100 side in the state of communication is turned on with "the control mode=independent" as described above, the other image forming apparatus 300 side included in the image forming system made up of a plurality of connected image forming apparatuses remains in the state equivalent to the stopped state. Thus, an appropriate power management can be performed, whereby the wasteful power consumption can be reduced.

In addition, in the image forming apparatus 300, the control section 301 and the modem 302 are on, and the control section 301 repeatedly checks the existence or non-existence of the activation instruction from the I/O Port 101*i* to the I/O Port 301*i* and the existence or non-existence of the communication (start-up-communication instruction) from the external device to the modem 302 by checking the state of the I/O Port 301*i* (steps S201-S203 in FIG. 3).

Here, in the case that the start-up-communication instruction from the external device to the modem 302 is confirmed while there is no activation instruction from the I/O Port 101*i* to the I/O Port 301*i* (steps S201-S203 in FIG. 3, step S202: NO, step S203: YES), the control section 301 determines that the control mode=independent for the image forming apparatus 300 (step S204 in FIG. 3, the state in FIG. 2: the state of communication (slave apparatus), and the control mode=independent).

Thus, the control section 301 activates the image forming apparatus 300 to be in the state of communication so as to address the remote diagnosis and the like (step S205 in FIG. 3). In other words, the functions (the controller, the printer, and the sheet processing) other than the sections (the operation section 305, the scanner section 320, and the sheet supply section 307) which are not to be used are turned on. Further, in order to address the remote diagnosis and the like, the control section 301 provides an activation instruction to control section 401 from the I/O Port 301*i* through the I/O Port 401*i* to activate the sheet processing device 400, which is a peripheral device controlled by the image forming apparatus 300 (step S206 in FIG. 3). In this state, the control section 301 communicates with the external device through the modem 302 to perform the process of the remote diagnosis and the like (step S207 in FIG. 3).

Although the image forming apparatus 300 side in the state of communication is turned on with "the control mode=independent", the other image forming apparatus 100 side included in the image forming system made up of a plurality of connected image forming apparatuses remains in the state equivalent to the stopped state. Thus, an appropriate power management can be performed, whereby the wasteful power consumption can be reduced.

Here, if the operator operates the sub power switch 105*sw*, and it is confirmed that the sub power switch 105*sw* is changed to the on-state (steps S101 and S102 in FIG. 3, step S102: ON), the control section 101 determines that the control mode=in tandem for the image forming apparatus 100 (step S108 in FIG. 3, the state in FIG. 2: the operating state, and the control mode=in tandem).

Thus, the control section 101 activates the image forming apparatus 100 to be in the operating state so as to deal with the operation of normal image formation and scanning as the image forming system made up of a plurality of connected image forming apparatuses (step S109 in FIG. 3). In other words, the functions (the operation section, the controller, the scanner, the sheet supply section, and the printer) other than the sections (the sheet processing control on the side of the image forming apparatus 100) which are not to be used are turned on. Further, in order to address the image formation operation, the control section 101 provides the activation instruction from the I/O Port 101*i* through the I/O Port 51*i* to the control section 51 so as to activate the sheet supply device 50 as the peripheral device to be controlled by the image forming apparatus 100 (step S110 in FIG. 3).

Then, since the control section 101 has set the control mode=in tandem, the control section 101 provides the activation instruction to change the state of the image forming apparatus 300 to the operating state from the I/O Port 101*i* through the I/O Port 301*i* to the control section 301 (step S111 in FIG. 3). In addition to providing the activation instruction to the control section 301, the control section 101 monitors occurrence of a reply signal representing the activated state from the control section 301 for (step S112 in FIG. 3).

On the other hand, in the image forming apparatus 300, the control section 301 is checking the state of the I/O Port 301*i* (step S201 in FIG. 3), and when the activation instruction from the control section 101 to the control section 301 is confirmed (step S202 in FIG. 3: YES), the control section 301 determines that the control mode=in tandem for the image forming apparatus 300 (step S208 in FIG. 3, the state in FIG. 2: the operating state, and the control mode=in tandem).

Then, the control section 301 activates the image forming apparatus 300 to be in the operating state so as to deal with the operations of the normal image formation as the image forming system made up of a plurality of connected image forming apparatuses (step S209 in FIG. 3). In other words, the functions (the controller, the printer, and the sheet processing) other than the sections (the operation section 305, the scanner section 320, and the sheet supply section 307) which are not to be used are turned on. Note that when the completion of the operation of activation in response to the activation instruction from the control section 101, the control section 301 notifies the control section 101 of the reply signal indicating the completion of activation from the I/O Port 301*i* to the I/O Port 101*i* (step S209 in FIG. 3). Further, in order to deal with the image formation operation as the image forming system made up of a plurality of connected image forming apparatuses, the control section 301 provides the activation instruction to the control section 401 from the I/O Port 301*i* through the I/O Port 401*i* to activate the sheet processing device 400, which is the peripheral device controlled by the image forming apparatus 300 (step S210 in FIG. 3).

When the operating state is confirmed by the reply signal from the control section 301 (steps S112-S113 of FIG. 3: YES), the control section 101 makes an initial communication with the control section 301 from the I/O Port 101*i* through the I/O Port 301*i* to prepare the start of operation as the image forming system made up of a plurality of connected image forming apparatuses (step S114 in FIG. 3). Similarly, the control section 301 makes an initial communication with the control section 101 from the I/O Port 301*i* through the I/O Port 101*i* to prepare the start of operation as the image forming system made up of a plurality of connected image forming apparatuses (step S211 in FIG. 3).

Note that, not shown in the flow chart but assume that a communication from the external device have occurred during the operation under the above in tandem-activation control, and the communication from the external device has completed. In this case, the completion of the communication from the external device corresponds to the instruction of the independent-stop control; however, being instructed to perform the in tandem-activation control, the independent-stop control is not performed and the activated state is kept.

As described above, in the image forming system made up of a plurality of connected image forming apparatuses, by selectively using the in tandem-activation control and the independent-activation control depending on the states of operation, a management can be performed appropriately for each of the states of operation, as a result that the wasteful power consumption can be reduced.

In other words, in the case of the activation instruction through the sub power switch 105*sw* of the operation section 105, by performing the in tandem-activation control, the system can surely perform the image formation as the image forming system made up of a plurality of connected image forming apparatuses. Alternatively, in the case of the activation instruction through the modem 102 or 302 from the external device, by performing the independent-activation control to keep the side receiving no activation instruction in the stopped state, the operation such as the remote diagnosis can be performed with no waste. Thus, in the image forming system made up of a plurality of connected image forming apparatuses, the in tandem-activation control and the independent-activation control can be appropriately and selectively used with no waste, depending on the states of operation based on the various instructions. As a result, a management can be performed appropriately for each of the states of operation, whereby the wasteful power consumption can be reduced.

Operation of the Image Forming System

Stop Control

In the following description of the operation of the stop control, a first stop control for in tandem setting a plurality of image forming apparatuses in the stopped state is referred to as an "in tandem-stop control." Further, a second stop control for independently setting a plurality of image forming apparatuses in the stopped state is referred to as an "independent-stop control."

With reference to the flow chart of FIG. 4, the stop control of the image forming system will be described. Here, in the image forming system, the main power switch 104 is on, and the main power switch 304 is on. Thus, at least the control section 101, the modem 102, the control section 301, and the modem 302 are in the on-state.

Figure 4:
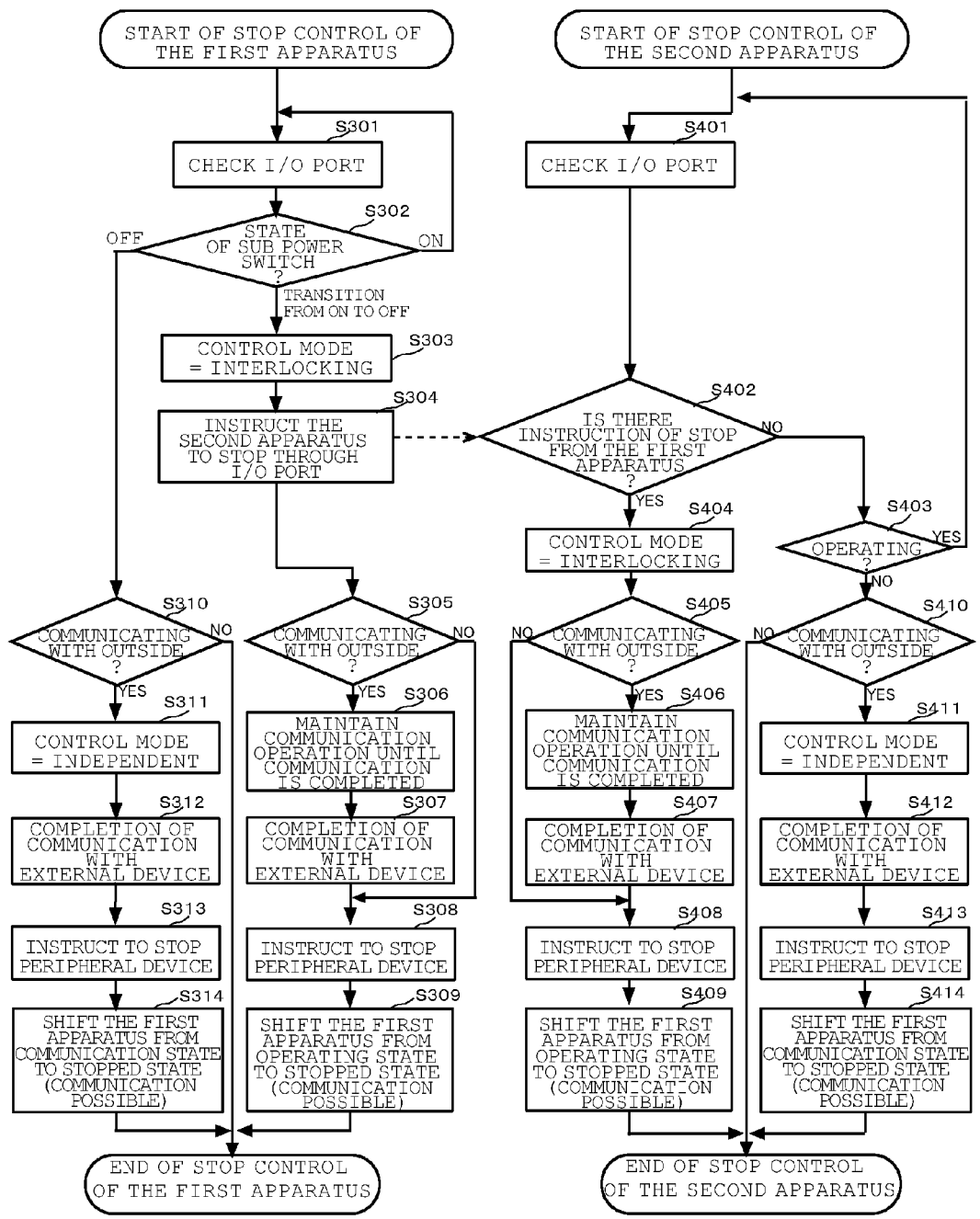
FIG. 4 is a flow chart showing an operating state of a stop control of an embodiment of the present invention.

In the image forming apparatus 100, the control section 101 repeatedly checks the state of the sub power switch 105*sw* by checking the state of the I/O Port 101*i* (steps S301-S302 in FIG. 4).

Here, when it is confirmed that the state of the sub power switch 105*sw* changes from the on-state to the off state due to the operation, of the operator, on the sub power switch 105*sw* (change from on to off in steps S301-S302 in FIG. 4), the control section 101 determines that the control mode=in tandem for the stop control of the image forming apparatus 100 (step S303 in FIG. 4). Thus, the control section 101 leads the image forming apparatus 100 in conjunction with the image forming apparatus 300 to the stopped state as the image forming system made up of a plurality of connected image forming apparatuses. For that purpose, the control section 101 provides the instruction of stop of the image forming apparatus 300 to the control section 301 from the I/O Port 101*i* through the I/O Port 301*i* (step S304 in FIG. 4).

Here, the control section 101 confirms whether the communication from the external device to the modem 102 is being performed, by checking the state of the I/O Port 101*i* (step S305 in FIG. 4). When the communication is being performed with the external device through the modem 102 (step S305 in FIG. 4: YES), the control section 101 controls so that the operation of the sections are maintained to continue the communication with the external device until those processes (the communication and various processes such as the remote diagnosis associated with a communication) is completed (step S306-S307 in FIG. 4) in spite of the stop control being performed (step S302 in FIG. 4: change from on to off). That is to say, in the case that the instruction of the in tandem-stop control has been received and when the independent-activation control is being performed by communicating with the external device, the control section 101 does not perform the in tandem-stop control and maintains the activated state.

When the communication with the external device through the modem 102 has been completed (step S307 in FIG. 4), or when there is no communication with the external device through the modem 102 (step S305 in FIG. 4: NO), the control section 101 provides the instruction of stop to the control section 51 from the I/O Port 101*i* through the I/O Port 51*i* to stop the sheet supply device 50 as the peripheral device controlled by the image forming apparatus 100, as the stop control (step S308 in FIG. 4). That is to say, in the case that the instruction of the in tandem-stop control has been received, and when the instruction of the independent-activation control has not been received, or when the independent-activation control has been completed, the control section 101 performs the in tandem-stop control.

Further, the control section 101 changes the functions of the sections of the image forming apparatus 100 from on to off to stop the operations, thereby shifting the image forming apparatus 100 from the operating state to the stopped state (step S309 in FIG. 4). That is to say, the functions (the operation section, the controller, the scanner, the sheet supply section, the printer, and the like; see the functions of the "operating state" in FIG. 2) being set on in the operating state are turned off. Note that the control section 101 controls the sections in the stopped state (communication possible) in FIG. 2 with the functions of the control section 101 and the modem 102 kept on.

On the other hand, in the image forming apparatus 300 the control section 301 is checking the state of the I/O Port 301*i* (step S401 in FIG. 4), and when the instruction of stop from the control section 101 to the control section 301 is confirmed (step S402 in FIG. 4: YES), the control section 301 determines that the control mode=in tandem for the stop control of the image forming apparatus 300 (step S404 in FIG. 4).

The control section 301 checks the state of the I/O Port 301*i* to confirm whether the communication to the modem 302 from the external device is being performed (step S405 in FIG. 4). If the communication through the modem 302 with the external device is being performed (step S405 in FIG. 4: YES), the control section 301 controls so as to keep the sections operating so that even when the stop control is being performed (step S402 in FIG. 4: YES), that process (the communication and the remote diagnosis and the like accompanying the communication) is kept being performed until the completion of the communication with the external device (steps S406 and S407 in FIG. 4). That is to say, in the case that the instruction of the in tandem-stop control is received and when the independent-activation control is being performed by the communication with the external device, the control section 301 maintains the activated state instead of performing the in tandem-stop control.

If the communication through the modem 302 with the external device has been completed (step S407 in FIG. 4), or if there is no communication through the modem 302 with the external device (step S405 in FIG. 4: NO), the control section 301 provides the instruction of stop as the stop control to the control section 401 (step S408: FIG. 4) from the I/O Port 301$i$ through the I/O Port 401$i$ to stop the sheet processing device 400, which is the peripheral device controlled by the image forming apparatus 300. That is to say, in the case that the instruction of the in tandem-stop control is received, and the instruction of the independent-activation control is not received or the independent-activation control has been completed, the control section 301 performs the in tandem-stop control.

Further, the control section 301 changes the functions of the sections of the image forming apparatus 300 from on to off to stop the operations as the stop control, thereby shifting the state of the image forming apparatus 300 from the operating state to the stopped state (step S409 in FIG. 4). In other words, the functions (the controller, the printer, the sheet processing, and the like; see "operating state" of FIG. 2) being set on in the operating state are turned off. Note that the control section 301 controls the sections to be in the stopped state (communication possible) in FIG. 2 with the function of the control section 301 and the function of the modem 302 kept on.

In a case that in the image forming apparatus 100 it is confirmed, through the state check of the I/O Port 101$i$ by the control section 101, that the sub power switch 105$sw$ is kept in the off state (steps S301-S302 in FIG. 4: off state), the control section 101 checks the state of the I/O Port 101$i$ to confirm whether the communication with the modem 102 from the external device is being performed (step S310 in FIG. 4).

If the communication through the modem 102 with the external device is being performed (step S310 in FIG. 4: YES), the control section 101 determines that the control mode=independent for the stop control of the image forming apparatus 100 (step S311 in FIG. 4).

Note that since, during the communication with the sub power switch 105$sw$ being in the off state, the functions of the sections are on for the remote diagnosis and the like (the state in FIG. 2: state of communication (master apparatus), the control mode=independent), these functions need to be turned off.

Then, if the communication through the modem 102 with the external device has been completed (step S312 in FIG. 4), the control section 101 provides the instruction of stop from the I/O Port 101$i$ to the I/O Port 51$i$ to the control section 51, as the stop control, to stop the sheet supply device 50, which is the peripheral device controlled by the image forming apparatus 100 (step S313 in FIG. 4). Further, the control section 101 changes the functions of the sections of the image forming apparatus 100 from on to off to stop the operations as the stop control, thereby shifting the image forming apparatus 100 from the state of communication to the stopped state (step S314 in FIG. 4). That is to say, in the case that the instruction of the independent-stop control is received (the communication with the external device is completed) (step S312 in FIG. 4), and the instruction of the in tandem-activation control is not received, the independent-stop control is performed in response to the completion of the communication (step S314 in FIG. 4). Therefore, the functions (the operation section, the controller, the scanner, the sheet supply section, the printer, and the like, see the functions of the "state of communication" of FIG. 2) being set on in the state of communication are turned off. Note that the control section 101 controls the sections to be in the stopped state (communication possible) in FIG. 2 with the function of the control section 101 and the function of the modem 102 kept on.

If in the image forming apparatus 100 the state check of the I/O Port 101$i$ by the control section 101 shows that the sub power switch 105$sw$ is kept in the off state (steps 301-S302 in FIG. 4: off state) and the communication with the modem 102 from the external device is not being performed (step S310 in FIG. 4: NO), it is already in the stopped state and the process is finished.

In the image forming apparatus 300, if the instruction of stop from the control section 101 to the control section 301 is not confirmed (step S402 in FIG. 4: NO) by the state check of the I/O Port 301$i$ by the control section 301 (step S401 in FIG. 4); when the image forming apparatus 300 is being performed (step S403 in FIG. 4: YES), the state check of the I/O Port 301$i$ is repeated (step S401 in FIG. 4, S402).

If the state check of the I/O Port 301$i$ (step S401 in FIG. 4) shows that the instruction of stop from the control section 101 to the control section 301 is not confirmed (step S402 in FIG. 4: NO), and the image forming apparatus 300 is not operating (step S403 in FIG. 4: NO), the control section 301 confirms whether the communication with the modem 302 from the external device is being performed (step S410 in FIG. 4).

If the communication through the modem 302 with the external device is being performed (step S410 in FIG. 4: YES), the control section 301 determines that the control mode=independent for the stop control of the image forming apparatus 300 (step S411 in FIG. 4).

Note that since the functions of the sections are on (the state in FIG. 2: state of communication (slave apparatus), the control mode=independent) for the remote diagnosis and the like during the communication at the time of not operating (step S403 in FIG. 4: NO), these functions need to be turned off.

Then, when the communication through the modem 302 with the external device has been completed (step S412 in FIG. 4), the control section 301 provides the instruction of stop to the control section 401 as the stop control (step S413 in FIG. 4) from the I/O Port 301$i$ through the I/O Port 401$i$ to stop the sheet processing device 400, which is the peripheral devices controlled by the image forming apparatus 300. Further, the control section 101 changes the functions of the sections of the image forming apparatus 300 from on to off as the stop control, thereby shifting the image forming apparatus 300 from the state of communication to the stopped state (step S414 in FIG. 4). That is to say, in the case that the instruction of the independent-stop control is received (the communication with the external device is completed) (step S412 in FIG. 4), and the instruction of the in tandem-activation control is not received, the independent-stop control is performed in response to the completion of the communication (step S414 in FIG. 4). Therefore, the functions (the controller, the printer, the sheet processing, and the like; see the functions of the "state of communication" of FIG. 2) being set on in the state of communication are tuned off. Note that the control section 301 controls the sections to be in the stopped state (communication possible) in FIG. 2 with the function of the control section 301 and the function of the modem 302 kept on.

In the image forming apparatus 300, if the state check of the I/O Port 301i by the control section 301 (step S401 in FIG. 4) shows that the instruction of stop from the control section 101 to the control section 301 is not confirmed (step S402 in FIG. 4: NO), that the image forming apparatus 300 is not being performed (step S403 in FIG. 4: NO), and that the communication by the modem 302 is not being performed (step S410 in FIG. 4: NO), the state is already in the stopped state and the process is finished.

As described above, since the image forming system made up of a plurality of connected image forming apparatuses has the in tandem-stop control in which the plurality of image forming apparatuses are in tandem put in the stopped state and the independent-stop control in which the plurality of image forming apparatuses are independently put in the stopped state; thus in the image forming system made up of a plurality of connected image forming apparatuses in which the in tandem-activation control and the independent-activation control are selectively used depending on each operating state, whereby a control appropriate for each operating state with respect to the stop control can be performed. As a result, the wasteful power consumption can be reduced.

Further, also in any of the image forming apparatuses, when the instruction of the independent-activation control is not received, the in tandem-stop control is performed depending on the instruction of the in tandem-stop control, and when the instruction of the independent-activation control is received by any of the image forming apparatuses, the in tandem-stop control is not performed despite the instruction of the in tandem-stop control and the activated state is maintained while the independent-activation control is being performed; thus in the image forming system made up of a plurality of connected image forming apparatuses in which the in tandem-activation control and the independent-activation control are selectively used depending on each operating state, whereby a control appropriate for each operating state with respect to the stop control can be performed. As a result, the wasteful power consumption can be reduced.

Further, in the image forming apparatus having accepted the instruction of the independent-stop control, when the instruction of the in tandem-activation control is not received, the independent-stop control is performed depending on the instruction of the independent-stop control; and in the image forming apparatus having accepted the instruction of the independent-stop control, when the in tandem-activation control has been received, the activated state is maintained instead of performing the independent-stop control despite the instruction of the independent-stop control; thus in the image forming system made up of a plurality of connected image forming apparatuses in which the in tandem-activation control and the independent-activation control are selectively used depending on each operating state, whereby a control appropriate for each operating state with respect to the stop control can be performed. As a result, the wasteful power consumption can be reduced.

In addition, by dealing with the instruction of stop through the sub power switch 105sw of the operation section 105 as the instruction of the in tandem-stop control, the image formation can be surely performed and completed, and by dealing with the completion of the communication through the modems 102 and 302 from the external device as the instruction of the independent-stop control, the operation of the remote diagnosis and the like can be performed and completed with no waste. As a result, in the image forming system made up of a plurality of connected image forming apparatuses, it is possible to perform a control appropriate for each operating state while appropriately and selectively using with no waste the in tandem-activation control, the independent-activation control, the in tandem-stop control, and the independent-stop control depending on each operating state based on the various instructions. As a result, the wasteful power consumption can be reduced.

Another Embodiment

In the above-described embodiments, the components (the sheet supply device 50, the image forming apparatus 100, the image forming apparatus 300, and the sheet processing device 400) of an image forming system shown as a specific example is just an example, and various deformations may be possible.

For example, in a case of an image forming system having three or more image forming apparatuses, controls similar to the above descriptions can be performed; thus, by appropriately and selectively using with no waste the in tandem-activation control, the independent-activation control, the in tandem-stop control, and the independent-stop control depending on each operating state based on the various instructions, a control appropriate for each operating state can be performed. As a result, the wasteful power consumption can be controlled.

The above-described modems 102 and 302 can be replaced by a network controller or the like for a LAN connection. Further, with respect to the communication with the I/O Port 101i and the I/O Port 301i, a LAN connection or the like can replace. In other words, the modems and the I/O Ports can be replaced in many ways as communication sections.

In addition, in the above embodiments, the parts which is described to perform the remote diagnosis and the like through communication can be applied to various communications including upgrading software, firmware, and the like and checking a counter for counting the number of image formation.

What is claimed is:

1. An image forming system comprising:
a plurality of image forming apparatuses, each of the image forming apparatuses including:
an image forming section configured to form an image on a recording sheet; and
a control section configured to control sections of the image forming apparatus,
wherein:
the plurality of image forming apparatuses are connected so that each image forming apparatus is able to perform image formation on a same recording sheet;
the control section included in any one of the image forming apparatuses has a function to perform a first activation control in which the plurality of image forming apparatuses are in tandem activated from a stopped state and a second activation control in which each of the plurality of image forming apparatuses is independently activated from the stopped state;
the control section has a function to perform either of the first activation control and the second activation control, depending on a type of a provided instruction;
each of the plurality of image forming apparatuses comprises a communication section configured to communicate with an external device outside of the image forming system;

any one of the plurality of image forming apparatuses comprises an operation section to which various types of instructions are input;

the control section performs the first activation control when the input instruction is an activation instruction through the operation section, and performs the second activation control when the input instruction is an activation instruction from the external device through the communication section; and the communication section has a function to communicate with another control section in the image forming system in addition to the external device, and the control section performs the first activation control when the input instruction is an activation instruction from the another control section through the communication section.

2. An image forming system comprising:

a plurality of image forming apparatuses, each of the image forming apparatuses including:
- an image forming section configured to form an image on a recording sheet; and
- a control section configured to control sections of the image forming apparatus, wherein:

the plurality of image forming apparatuses are connected so that each image forming apparatus is able to perform image formation on a same recording sheet;

wherein the control section included in any one of the image forming apparatuses has a function to perform a first activation control in which the plurality of image forming apparatuses are in tandem activated from a stopped state and a second activation control in which each of the plurality of image forming apparatuses is independently activated from the stopped state; and the control section has a function to perform a first stop control to put the plurality of image forming apparatuses in tandem in the stopped state, and to perform a second stop control to put each of the plurality of image forming apparatuses independently in the stopped state.

3. The image forming system of claim 2, wherein:

the control section performs, when the control section has accepted an instruction of the first stop control and none of the image forming apparatuses has received an instruction of the second activation control, the first stop control; and the control section does not perform, when the control section has accepted the instruction of the first stop control and any of the image forming apparatuses has received the instruction of the second activation control, the first stop control and maintains the activated state while performing the second activation control.

4. The image forming system of claim 2, wherein in the image forming apparatus which has accepted the instruction of the second stop control, the control section performs, when the control section has not received the instruction of the first activation control, the second stop control; and the control section does not perform, when the control section has received the instruction of the first activation control, the second stop control and maintains the activated state.

5. The image forming system of claim 2, wherein:

each of the plurality of image forming apparatuses comprises a communication section configured to communicate with an external device outside of the image forming system;

any one of the plurality of image forming apparatuses comprises an operation section to which various types of instructions are input;

the control section deals with an instruction of stop through the operation section as the first stop control; and the control section deals with a completion of communication from the external device through the communication section as the second stop control.

6. A method for controlling an image forming system, in which a plurality of image forming apparatuses are connected so that each of the image forming apparatuses is able to form an image on a same recording sheet, the method comprising:

causing a control section of any one of the image forming apparatuses to perform a first activation control in which the plurality of image forming apparatuses are in tandem activated from a stopped state, and a second activation control in which each of the plurality of image forming apparatuses is independently activated from the stopped state;

causing the control section to perform either of the first activation control and the second activation control, depending on a type of a provided instruction;

wherein:

each of the plurality of image forming apparatuses comprises a communication section configured to communicate with an external device outside of the image forming system;

any one of the plurality of image forming apparatuses comprises an operation section to which various types of instructions are input;

the method further comprises:
causing, when the provided instruction is an activation instruction through the operation section, the control section to perform the first activation control, and
causing, when the provided instruction is an activation instruction from the external device through the communication section, the control section to perform the second activation control;

the communication section has a function to communicate with another control section in the image forming system in addition to the external device; and the method further comprises:
causing the control section to perform the first activation control when the provided instruction is an activation instruction from the another control section through the communication section.

7. A method for controlling an image forming system, in which a plurality of image forming apparatuses are connected so that each of the image forming apparatuses is able to form an image on a same recording sheet, the method comprising:

causing a control section of any one of the image forming apparatuses to perform a first activation control in which the plurality of image forming apparatuses are in tandem activated from a stopped state, and a second activation control in which each of the plurality of image forming apparatuses is independently activated from the stopped state; and causing the control section to perform either of a first stop control to put the plurality of image forming apparatuses in in tandem in a stopped state and a second stop control to put each of the plurality of image forming apparatuses independently in the stopped state.

8. The method of claim 7, further comprising:

causing, when the control section has accepted an instruction of the first stop control and none of the image forming apparatuses has received an instruction of the second activation control, the control section to perform the first stop control; and causing, when the control section has accepted the instruction of the first stop control and any of the image forming apparatuses has received the instruction of the second activation control, the control section not to perform the first stop control and to maintain the activated state while performing the second activation control.

9. The method of claim 7, wherein in the image forming apparatus which has accepted the instruction of the second stop control, the method further comprises:
causing the control section to perform the second stop control when the control section has not received the instruction of the first activation control, and
causing the control section not to perform the second stop control and to maintain the activated state when the control section has received the instruction of the first activation control.

10. The method of claim 7, wherein:
each of the plurality of image forming apparatuses comprises a communication section configured to communicate with an external device outside of the image forming system;
any one of the plurality of image forming apparatuses comprises an operation section to which various types of instructions are input; and
the method further comprises:
causing the control section to deal with an instruction of stop through the operation section as the first stop control; and
causing the control section to deal with a completion of communication from the external device through the communication section as the second stop control.

11. An image forming apparatus comprising:
an image forming section configured to form an image on a recording sheet; and
a control section configured to control sections of the image forming apparatus, wherein:
the image forming apparatus is usable in an image forming system in which a plurality of image forming apparatuses are connected with each other so that the image forming apparatuses are able to form images on a same recording sheet;
the control section has a function to perform a first activation control in which the plurality of image forming apparatuses are in tandem activated from a stopped state and a second activation control in which each of the plurality of image forming apparatuses is independently activated from the stopped state;
the control section has a function to control either of the first activation control and the second activation control, depending on a type of a provided instruction;
the image forming apparatus further comprises:
a communication section configured to communicate with an external device outside of the image forming system; and
an operation section to which various types of instructions are input;
the control section performs the first activation control when the input instruction is an activation instruction through the operation section, and performs the second activation control when the input instruction is an activation instruction from the external device through the communication section; and
the communication section has a function to communicate with another control section in the image forming system in addition to the external device, and the control section provides an activation instruction of the first activation control to the another control section through the communication section.

12. An image forming apparatus comprising:
an image forming section configured to form an image on a recording sheet; and
a control section configured to control sections of the image forming apparatus,
wherein:
the image forming apparatus is usable in an image forming system in which a plurality of image forming apparatuses are connected with each other so that the image forming apparatuses are able to form images on a same recording sheet;
the control section has a function to perform a first activation control in which the plurality of image forming apparatuses are in tandem activated from a stopped state and a second activation control in which each of the plurality of image forming apparatuses is independently activated from the stopped state; and
the control section has a function to perform a first stop control to put the plurality of image forming apparatuses in in tandem in a stopped state, and to perform a second stop control to put each of the plurality of image forming apparatuses independently in a stopped state.

13. The image forming apparatus of claim 12, wherein:
in a case in which the first stop control is to be performed and the image forming apparatuses has not received an instruction of the second activation control, the control section performs the first stop control; and
in a case in which the first stop control is to be performed and the image forming apparatuses has received the instruction of the second activation control, the control section does not perform the first stop control and maintains the activated state while performing the second activation control.

14. The image forming apparatus of claim 12, wherein in a case in which the control section has accepted the instruction of the second stop control, and when the first activation control is not to be performed, the control section performs the second stop control; and
wherein in a case in which the control section has accepted the instruction of the second stop control and the first activation control is to be performed, the control section does not perform the second stop control and maintains the activated state.

15. The image forming apparatus of claim 12, further comprising:
a communication section configured to communicate with an external device outside of the image forming system; and
an operation section to which various types of instructions are input;
wherein:
the control section deals with an instruction of stop through the operation section as the first stop control; and
the control section deals with a completion of communication from the external device through the communication section as the second stop control.

* * * * *